Figure 1:
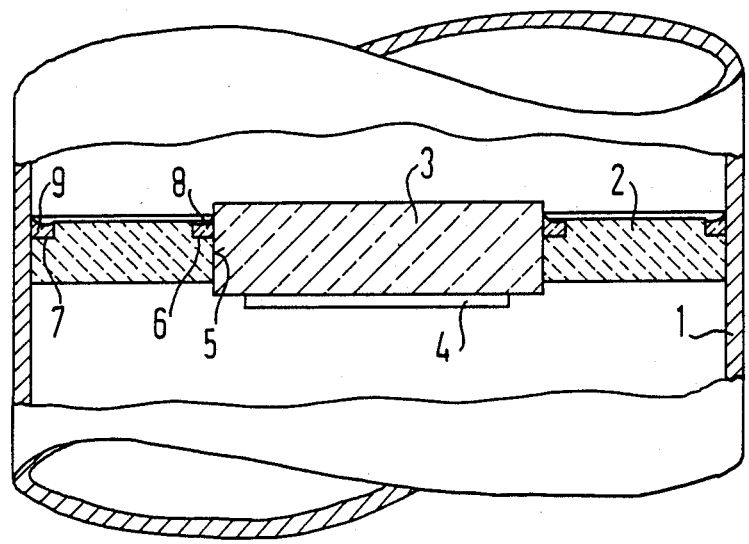

United States Patent [19]

Barth et al.

[11] Patent Number: 4,864,582
[45] Date of Patent: Sep. 5, 1989

[54] GAS LASER TUBE AND METHOD FOR MANUFACTURING THE SAME

[75] Inventors: Heinz Barth, Munich; Erwin Hübner, Grafing; Hinrich Heynisch, Gräfelfing; Adolf Schneider, Munich, all of Fed. Rep. of Germany

[73] Assignee: Siemens Aktiengesellschaft, Munich, Fed. Rep. of Germany

[21] Appl. No.: 750,681

[22] Filed: Jun. 28, 1985

[30] Foreign Application Priority Data

Jun. 29, 1984 [DE] Fed. Rep. of Germany ....... 3424120

[51] Int. Cl.⁴ .............................................. H01S 3/03
[52] U.S. Cl. ........................................ 372/61; 372/99; 372/103; 372/107
[58] Field of Search .................... 372/61, 65, 99, 103, 372/107

[56] References Cited

U.S. PATENT DOCUMENTS

| | | | |
|---|---|---|---|
| 3,555,450 | 1/1971 | Rockwell, Jr. ..................... | 331/94.5 |
| 3,717,823 | 2/1973 | Abdale et al. ..................... | 372/103 |
| 3,718,868 | 2/1973 | Pao et al. ........................ | 372/99 |
| 3,836,236 | 9/1974 | Kirk et al. ....................... | 372/99 |
| 4,064,466 | 12/1977 | Seki et al. ....................... | 372/103 |
| 4,240,046 | 12/1980 | Kolb et al. ....................... | 372/103 |
| 4,349,908 | 9/1982 | Hara et al. ....................... | 372/103 |
| 4,421,386 | 12/1983 | Podgorski ......................... | 350/319 |
| 4,426,708 | 1/1984 | van Etteger ....................... | 372/103 |
| 4,475,202 | 10/1984 | Baron et al. ...................... | 372/61 |
| 4,573,162 | 2/1986 | Bakowsky et al. ................... | 372/61 |
| 4,617,668 | 10/1986 | Rudke et al. ...................... | 372/61 |

Primary Examiner—William L. Sikes
Assistant Examiner—Robert E. Wise
Attorney, Agent, or Firm—Herbert L. Lerner; Laurence A. Greenberg

[57] ABSTRACT

A gas laser tube assembly includes a gas laser tube having ends, optical elements each vacuum-tightly closing off a respective end of the gas laser tube, each of the optical elements including a washer-shaped ceramic flange and a terminating plate being transparent to laser radiation and thermally matched to the ceramic flange, the ceramic flange having an outer rim joined to the gas laser tube and a central beam passage opening formed therein, and the terminating plate having two base surfaces, and glass solder connecting the terminating plate to the ceramic flange with the terminating plate covering the beam passage opening and projecting beyond the ceramic flange with at least one of the base surfaces thereof and a method of manufacturing the same.

12 Claims, 1 Drawing Sheet

GAS LASER TUBE AND METHOD FOR MANUFACTURING THE SAME

The invention relates to a gas laser tube including optical elements each vacuum-tightly closing off an end of the gas laser tube, each of the optical elements including a washer-shaped flange and a terminating plate being transparent to laser radiation and thermally matched to the flange, the flange having an outer rim joined to the gas laser tube and a central beam passage opening formed therein, and the terminating plate having two base surfaces, and glass solder connecting the terminating plate to the flange with the terminating plate covering the beam passage opening and projecting beyond the flange with at least one of the base surfaces thereof.

Such a laser is described, for instance, in U.S. Pat. No. 3,717,823.

It has been customary for years to fix the optical terminations of a laser tube such as Brewster windows or partially transparent resonator mirrors in place, by means of a glass solder joint. Glass solder has excellent sealing properties but requires process temperatures of more than 400° C., which cause the optical quality of the terminations to suffer.

It was therefore considered relatively early on to solder the window or mirror body into a metal frame which allows subsequent polishing and/or coating of the body, as in U.S. Pat. No. 3,555,450. This frame, which is in turn welded or soldered at its outer periphery to the plasma tube, may be formed of copper, nickel or cobalt and should have a small wall thickness of between about 0.01 cm and 0.06 cm as well as a corrugated profile, so that the framed body can remain as free of thermal stresses as possible. Such an elastic mounting is relatively uncomplicated but, as has been found, cannot always hold the optical body in its prescribed position under the stresses of normal operation.

There is less expectation of adjustment errors if the transparent body is inserted into a metallic washer, this unit is placed on a metal apperture that is fused to the laser tube and both metal parts are welded together at the rim, as in U.S. Pat. No. 3,717,823. With this construction, the double flange must be capable of controlling a temperature difference of about 1200° C. between the weld and the light-transparent body during the welding process. These requirements can be met only if the two metal parts are very thin and/or have a large outside diameter, so that the entire suspension is not particularly stable and/or requires considerable crosswise dimensions. In addition, the structure is more expensive, if only for the reason that three vacuum-tight joints must be made instead of two.

It is accordingly an object of the invention to provide a gas laser tube and method for manufacturing the same, which overcomes the hereinafore-mentioned disadvantages of the heretofore-known devices of this general type, and to frame the optical terminations in such a manner that the structure is compact and rugged, cannot be misadjusted easily and in addition, requires no special manufacturing effort.

With the foregoing and other objects in view there is provided, in accordance with the invention, a gas laser tube assembly, comprising a gas laser tube having ends, optical elements each vacuum-tightly closing off a respective end of the gas laser tube, each of the optical elements including a washer-shaped ceramic flange and a terminating plate or body being transparent to laser radiation and thermally matched to the ceramic flange, the ceramic flange having an outer rim Joined to the gas laser tube and a central beam passage opening formed therein, and the terminating plate having two base surfaces, and glass solder connecting the terminating plate to the ceramic flange with the terminating plate covering the beam passage opening and projecting beyond the ceramic flange with at least one of the base surfaces thereof. If, according to the invention, the flange and the plate are to be "thermally matched", this requirement means that a glass solder joint which is permanently gas-tight under the usual conditions, can be brought about between the two parts. Normally, this is possible if the flange has an average thermal coefficient of expansion, in the temperature range of interest, which is between 0.9 and 1.2-times the corresponding plate coefficient. A particularly secure joint comes about if the flange expands with temperature somewhat more than the plate.

The proposed ceramic setting or mounting only has moderate thermal conductivity which is distinctly below the values of customary metals, especially if aluminum oxide is used. A single washer-shaped flange inserted into the laser tube is therefore sufficient in most cases.

The fact that a ceramic flange has not heretofore been considered in the art is possible because to date, no economically justifiable means had been proposed as to how the process heat required for fixing the ceramic could be limited to the outer region, and to that extent no advantages were expected from the high heat resistance. However, such a viewpoint is obsolete. A glass/solder joint is possible, for example, in which the solder joint is irradiated in a targeted manner by focused infrared light sources or lasers while the ceramic disc is left to rotate at the same time.

In accordance with another mode of the invention there is provided a method of manufacturing a gas laser tube assembly, including a gas laser tube having ends, and optical elements for closing off the ends of the gas laser tube, each of the optical elements including a washer-shaped ceramic flange having an outer rim and having a central beam passage opening formed therein, a terminating plate having surfaces and being transparent to laser radiation and thermally matched to the ceramic flange, and a transition part, which comprises initially connecting the outer ring ceramic flange to the transition part, subsequently soldering the ceramic flange to the terminating plate with the terminating plate covering the beam passage opening and projecting beyond the ceramic flange with at least one surface thereof, subsequently smoothing at least one surface of the terminating plate, enclosing the outside of the gas laser tube with a metallic sleeve at a given location along the tube, and joining the transition part to the inside of the gas laser tube at the given location at elevated temperatures with the metallic sleeve in place.

If the light-transparent body must be particularly well protected, it is advisable to insert the further metallic transition part between the laser tube and the ceramic disc and to finish the surface of the optical body only when the disc is joined to the body and the transition part. This intermediate piece which advantageously has a U-shaped profile, could be fastened to the disc by glass solder or by a conventional metal/ceramic joint, and it could be connected to the end of a metallic laser tube by a welded joint.

In accordance with an additional mode of the invention, there is provided a method which comprises coating the at least one smoothed surface of the terminating plate.

In accordance with another feature of the invention, the terminating plate is inserted in the beam passage opening formed in the ceramic flange.

In accordance with an added feature of the invention the glass solder is disposed in a recess formed in the ceramic flange surrounding the terminating plate.

In accordance with a further feature of the invention, the ceramic flange has a larger coefficient of thermal expansion than the terminating plate.

In accordance with again another feature of the invention, there is provided additional glass solder connecting the ceramic flange to the gas laser tube.

In accordance with again an additional feature of the invention, the ceramic flange has a plurality of circular slots formed therein at different distances from the center of the ceramic flange.

In accordance with again a further feature of the invention, the terminating plate is formed of zinc selenide and the ceramic flange is formed of aluminum oxide.

In accordance with still an added feature of the invention, there is provided a metallic transition part disposed between the gas laser tube and the ceramic flange, the transition part being welded to the gas laser tube and soldered to the ceramic flange.

In accordance with still a further feature of the invention there is provided additional glass solder connecting the transition part to the ceramic flange.

In accordance with a concomitant feature of the invention, the transition part has a U-shaped profile with one U-leg soldered to the rim of the ceramic flange and another U-leg with an outer end welded to one of the ends of the gas laser tube.

Other features which are considered as characteristic for the invention are set forth in the appended claims.

Although the invention is illustrated and described herein as embodied in a gas laser tube and method for manufacturing the same, it is nevertheless not intended to be limited to the details shown, since various modifications and structural changes may be made therein without departing from the spirit of the invention and within the scope and range of equivalents of the claims.

Figure 2:
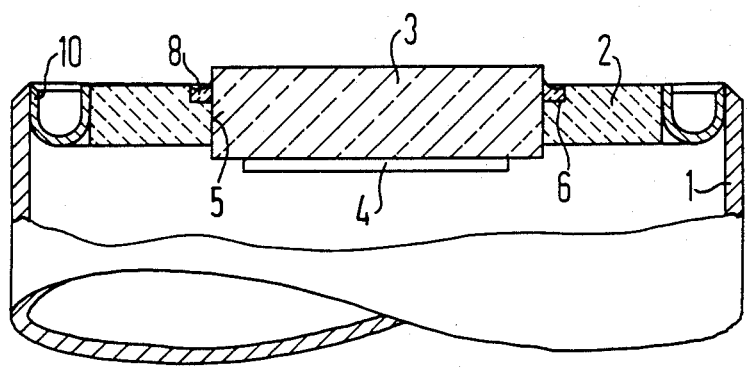

The construction and method of operation of the invention, however, together with additional objects and advantages thereof will be best understood from the following description of specific embodiments when read in connection with the accompanying drawings, in which:

FIG. 1 is a fragmentary, diagrammatic, cross-sectional view of one end of a first embodiment of a gas laser tube according to the invention, which is partly broken away; and FIG. 2 is a similar view of a second embodiment of the device.

Referring now to the figures of the drawings in detail and first, particularly, to FIG. 1 thereof, there is seen a laser tube which belongs to a "sealed off" $CO_2$ laser that is provided for an output power of some 10 watts and could be used in medicine, for example. The laser has an integrated resonator, which means that both resonator mirrors are connected to the tube in a vacuum-tight manner. FIG. 1 shows the output end of the tube, including a metal cylinder 1 serving as the laser tube, a washer-shaped flange 2 serving as a mounting or setting and a terminating plate in the form of a mirror body 3.

The mirror body 3 is coated on the inside thereof with a dielectric multiple layer 4 which is partially transparent for a wavelength of 10.6 $\mu$m. The mirror body itself is formed of zinc selenide which, for all practical purposes, does not absorb in this wavelength range. Aluminum oxide is chosen for the washer, which is thermally matched to ZnSe. The washer-shaped flange 2 has a beam passage opening 5, into which the mirror body is inserted, with a base surface of the mirror body projecting beyond the flange on both sides. The washer-shaped flange contains a respective gap 6, 7 in vicinity of each of the opening 9 and the outer rim thereof, each of which receives a glass solder ring 8, 9.

The termination of the tube is constructed as follows: Initially, a ZnSe body is soldered to a ceramic disc, using a stable or crystallizing glass solder which is available either as a powder or in pre-pressed and sintered form. The two base surfaces of the body are then polished and the inside surface is provided with the required dielectric layers. Subsequently, the washer-shaped flange is inserted into the laser tube and is soldered by local light irradiation.

FIG. 2 shows a modified embodiment in which a further metallic transition part 10 with a U-shaped profile is located between the ceramic washer-shaped flange and the laser tube. The transition part 10 is hard-soldered at its inner U-leg by the conventional metal/ceramic technique and is welded at the tip of its outer U-leg to the end of the laser tube.

During the fabrication of the tube termination of FIG. 2, the procedure is as follows: After the washer-shaped flange is first connected to the transition part and then to the mirror body, the body surfaces are processed and this unit is then welded to the tube by a heliarc, argon arc or electron beam technique. The tube is surrounded by a copper ring at the height of the flange which transmits part of the heat required for welding to the outside and therefore additionally relieves the mirror body thermally.

The invention is not limited to the illustrated embodiments alone. Therefore, other materials, such as a germanium window, could also be used. Other gapless solder joint geometries can also be considered, such as butt soldering with a terminating plate placed on the washer. Apart from that, the thermal protection of the optical body can be improved by further measures, for instance by providing path-lengthening slots in the ceramic disc, such as in German Published, Non-Prosecuted Application DE-OS No. 33 07 233. Otherwise, the flange can be provided with more than one optical terminating element.

The foregoing is a description corresponding in substance to German Application P 34 24 120.5, dated June 29, 1984, the International priority of which is being claimed for the instant application, and which is hereby made part of this application. Any material discrepancies between the foregoing specification and the aforementioned corresponding German application are to be resolved in favor of the latter.

We claim:

1. Gas laser tube assembly, comprising a gas laser tube having ends, optical elements each vacuum-tightly closing off a respective end of said gas laser tube, each of said optical elements including a washer-shaped ceramic flange and a terminating plate being transparent to laser radiation and thermally matched to said ceramic flange, said ceramic flange having an outer rim joined to said gas laser tube and a central beam passage opening formed therein, and said terminating plate having two base surfaces, and glass solder connecting said terminating plate to said ceramic flange with said terminating plate covering said beam passage opening and projecting beyond said ceramic flange with at least one of said base surfaces thereof, said terminating plate being formed of zinc selenide.

2. Laser assembly according to claim 1, wherein said terminating plate is inserted in said beam passage opening formed in said ceramic flange.

3. Laser assembly according to claim 2, wherein said glass solder is disposed in a recess formed in said ceramic flange surrounding said terminating plate.

4. Laser assembly according to claim 1, wherein said ceramic flange has a larger coefficient of thermal expansion than said terminating plate.

5. Laser assembly according to claim 1, including additional glass solder connecting said ceramic flange to said gas laser tube.

6. Laser assembly according to claim 1, wherein said ceramic flange has a plurality of circular slots formed therein at different distances from the center of said ceramic flange.

7. Laser assembly according to claim 1, wherein said ceramic flange is formed of aluminum oxide.

8. Laser assembly according to claim 1, including a metallic transition part disposed between said gas laser tube and said ceramic flange, said transition part being welded to said gas laser tube and soldered to said ceramic flange.

9. Laser assembly according to claim 8, including additional glass solder connecting said transition part to said ceramic flange.

10. Laser assembly according to claim 9, wherein said transition part has a U-shaped profile with one U-leg soldered to said rim of said ceramic flange and another U-leg with an outer end welded to one of said ends of said gas laser tube.

11. Method of manufacturing a gas laser tube assembly, including a gas laser tube having ends, and optical elements for closing off the ends of the gas laser tube, each of the optical elements including a washer-shaped ceramic flange having an outer rim and having a central beam passage opening formed therein, a terminating plate made of zinc selenide, having surfaces and being transparent to laser radiation and thermally matched to the ceramic flange, and a transition part, which comprises initially connecting the outer ring ceramic flange to the transition part, subsequently soldering the ceramic flange to the terminating plate with the terminating plate covering the beam passage opening and projecting beyond the ceramic flange with at least one surface thereof, subsequently smoothing at least one surface of the terminating plate, enclosing the outside of the gas laser tube with a metallic sleeve at a given location along the tube, and joining the transition part to the inside of the gas laser tube at the given location at elevated temperatures with the metallic sleeve in place.

12. Method according to claim 11, which comprises coating the at least one smoothed surface of the terminating plate.

* * * * *